(12) United States Patent
Iio

(10) Patent No.: US 9,270,101 B2
(45) Date of Patent: Feb. 23, 2016

(54) OUTER COVER STRUCTURE FOR WIRE HARNESS

(75) Inventor: Kiyokazu Iio, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 101 days.

(21) Appl. No.: 13/878,676

(22) PCT Filed: Mar. 28, 2011

(86) PCT No.: PCT/JP2011/057605
§ 371 (c)(1),
(2), (4) Date: Apr. 10, 2013

(87) PCT Pub. No.: WO2012/053236
PCT Pub. Date: Apr. 26, 2012

(65) Prior Publication Data
US 2013/0206447 A1 Aug. 15, 2013

(30) Foreign Application Priority Data
Oct. 22, 2010 (JP) .................. 2010-237575

(51) Int. Cl.
*H02G 3/04* (2006.01)
*H02G 3/34* (2006.01)
(Continued)

(52) U.S. Cl.
CPC ............... *H02G 3/34* (2013.01); *B60R 16/0215* (2013.01); *H02G 3/0468* (2013.01); *H02G 3/0487* (2013.01); *H02G 3/32* (2013.01); *H02G 3/38* (2013.01)

(58) Field of Classification Search
CPC ......... H02G 3/04; H02G 3/0406; H02G 3/00; H02G 3/0462; H02G 3/06; H02G 3/0616; H02G 3/22; H02G 3/0468; H02G 3/34; H02G 3/0487; H02G 3/32; H02G 3/38; B60R 16/0215; B60R 16/00

USPC .......... 174/68.1, 68.3, 72 A, 135, 72 R, 72 C, 174/73.1, 74 R, 88 R, 70 C, 95, 99 R; 248/49, 248/68.1, 74.1, 74.2; 439/207

See application file for complete search history.

(56) References Cited

U.S. PATENT DOCUMENTS 6,717,055 B2 * 4/2004 Kato .......................... 174/72 A
7,628,447 B2 * 12/2009 Sugimoto et al. .............. 248/49
(Continued)

FOREIGN PATENT DOCUMENTS

JP 06-165339 6/1994
JP 2000-139014 5/2000
(Continued)

OTHER PUBLICATIONS

International Search Report of Jun. 21, 2011.

*Primary Examiner* — Angel R Estrada
(74) *Attorney, Agent, or Firm* — Gerald E. Hespos; Michael J. Porco; Matthew T. Hespos

(57) ABSTRACT

A protector for covering a wire harness is simplified and is enabled to be used commonly with other types of vehicles. Provided is an outer cover structure for a wire harness that is routed from a front portion of a vehicle interior toward a vehicle rear portion along an upper surface side of a sill side panel, only a narrow region of a floor harness from a position where a kicking plate is arranged to a rear tire house being covered with a protector that is small-sized, the narrow region corresponding to a rear end of the kicking plate, the protector having a shape of a small rectangular box with a shallow bottom, including only one clip for fixation that is provided projecting, and being used commonly with other types of vehicles.

12 Claims, 6 Drawing Sheets

(51) Int. Cl.
  *B60R 16/02* (2006.01)
  *H02G 3/32* (2006.01)
  *H02G 3/38* (2006.01)

(56) References Cited

U.S. PATENT DOCUMENTS 7,692,095 B2 * 4/2010 Katsumata et al. ......... 174/72 A
8,188,368 B2 * 5/2012 Suzuki ........................ 174/72 A
8,291,551 B2 * 10/2012 Bruss et al. ................. 174/72 A

FOREIGN PATENT DOCUMENTS

| JP | 2000-236609 | 8/2000 |
| JP | 2001-037040 | 2/2001 |
| JP | 2004-135449 | 4/2004 |
| JP | 2005-176560 | 6/2005 |
| JP | 2008-068811 | 3/2008 |
| JP | 2009-268163 | 11/2009 |

* cited by examiner

OUTER COVER STRUCTURE FOR WIRE HARNESS

BACKGROUND

1. Field of the Invention

The present invention relates to outer cover structures for a wire harness, and in particular to an improvement in an outer cover member such as a protector for protecting a wire harness that is routed on the lower surface side of a side sill of an automobile.

2. Description of the Related Art

A wire harness that is routed in an automobile is protected in a region where this is required by a protector made from a resin molded article through which the wire harness passes. By being covered with the protector, the wire harness is protected from external interfering substances, is limited in its route, and is limited in its shape such that, for example, its cross-sectional shape is flattened, so that the wire harness is capable of being inserted into a routing space.

Also, in a region where the wire harness needs to be protected not by the protector but by a simple protection or the like, the wire harness is inserted into an outer cover member such as a corrugated tube or a circular tube that is made from a resin molded article.

A number of such protectors for covering the wire harness have conventionally been proposed, for example, by JP H06-165339A, and JP 2000-236609A.

Among the wire harnesses that are routed in an automobile, there is a wire harness that is connected to a junction box mounted in a front portion of a vehicle interior and routed to the rear of the vehicle along a sill panel. This wire harness is hereinafter referred to as "floor harness", although it is also often referred to as "body harness".

Under doors of lateral side openings of the automobile, the floor harness is routed on the inner side of a sill side flange on a sill side panel. At positions under the side doors where kicking plates are arranged, the wire harness that is routed below is liable to be subjected to impact loads due to stepping of a driver or passenger, dropped baggage, or the like. Conventionally, therefore, the floor harness is covered with and protected by a protector so that no impact load is applied to the floor harness.

As illustrated in FIG. 10, a floor harness W/H needs to be protected, to be limited in its route, and to be limited in its shape, particularly from a region S1 underneath a side door to a region S2 within a rear wheel house 4 where the floor harness is routed. Accordingly, a relatively elongated protector 100 for these three-dimensional regions is provided so as to cover the floor harness. The protector 100 needs to be provided in different shapes for left and right sides, that is, the protector 100 needs to be provided as a left side protector 100A or a right side protector 100B as illustrated in FIGS. 11(A) and 11(B) depending on whether, for example, it is for a left-hand drive vehicle or a right-hand drive vehicle. The protector 100 (100A, 100B) has a three-dimensional shape and, therefore, needs to be fixed to the vehicle body at a plurality of locations. Therefore, there is a problem that, due to the complicated shape of the protector, the costs for the production of metal molds are high, resulting in high manufacturing costs, and it is time-consuming to mount the protector on the vehicle body.

Further, it is necessary to manufacture the protectors according to the shapes of vehicles, that is, to manufacture the protectors independently for each type of vehicle or each of a left-hand drive vehicle and a right-hand drive vehicle. Accordingly, many types of protectors are needed, causing a problem of a significant increase in cost.

In order to solve the above-described problem that provision of many types of protectors results in high costs, it is an object of the present invention to provide an outer cover structure for a wire harness that can employ a protector that is used commonly with vehicles that have different shapes depending on, for example, the type of vehicle or whether it is a left-hand drive vehicle or a right-hand drive vehicle, and that have different three-dimensional routing paths of a floor harness from an under portion of a side door to a rear tire house.

SUMMARY OF THE INVENTION

In order to solve the above-described problems, the present invention provides an outer cover structure for a wire harness, the wire harness being a floor harness that is routed from a front portion of a vehicle interior toward a vehicle rear portion along an upper surface side of a sill side panel, a portion of the floor harness extending from a position where a kicking plate is arranged to a rear tire house being covered only in a narrow region with a protector that is small-sized, the narrow region corresponding to a rear end of the kicking plate, and the protector having a shape of a small rectangular box with a shallow bottom, only one clip for fixation projecting from the protector, and the protector being used commonly with other types of vehicles.

The protector may include: a main body that includes, on front and rear sides, tape-wrapped portions that project at locations on the same level; and a cover that closes an upper surface opening of the main body, the protector including the tape-wrapped portions on the front and rear sides has a front-to-rear length that is not greater than 120 mm and a height that is 25 mm to 35 mm, and the protector includes a blade-like clip that is provided projecting from a center of a bottom wall of the main body.

As describe above, conventionally, the floor harness has externally been covered with an elongated protector in its region from a position where a kicking plate is arranged to the rear tire house. In contrast, in the present invention, only a narrow region of the floor harness that corresponds to the rear end portion of the kicking plate is covered with a protector. Therefore, it is possible to downsize the protector, so that only one clip for fixation suffices due to the downsizing, and it is also possible to reduce the number of steps for mounting the protector on the vehicle and to mount the protector even on an inclined surface of the vehicle body panel.

Further, the protector includes no three-dimensional bend, its exit and entrance have the same height, and the tape-wrapped portions are located at the same level, making it easy to wrap the floor harness with tape and to fix it to the protector.

Since the protector is downsized, the wire harness that is accommodated in the protector is hardly affected by bending. Furthermore, since the protector has a shape of a small general-purpose rectangular box, it can commonly be used in not only a specific vehicle but also in other types of vehicles.

When the floor harness has been routed in the vehicle, the protector may be arranged at a location where the protector receives a flange of the kicking plate that is provided projecting downward from the rear end of the kicking plate.

Therefore, it is possible to stably hold the kicking plate.

Further, it is preferable that the protector be fixed, with an end of a floor carpet in its width direction being disposed between an upper surface of the protector and a lower end of the flange of the kicking plate.

It is also preferable that the floor harness be covered with corrugated tubes on front and rear sides of the region of the floor harness covered with the protector, a sill clip is fitted onto the corrugated tube at a location below the front side of the kicking plate, and the sill clip includes a supporting projection having a holding groove into which a bracket that projects from a lower surface of the kicking plate is inserted and that holds the bracket.

As described above, by providing the sill clip, it is possible to hold the kicking plate without being lifted, making it possible to stably hold the kicking plate.

Note that the floor harness may be covered with a circular tube, instead of the corrugated tube. Alternatively, the floor harness may be wrapped and covered with a thick-walled sheet.

As described above, in the present invention, covering of a wire harness with a protector is limited to a narrow region of the protector where the wire harness needs to be covered with the protector, thereby achieving a downsizing of the protector. With the downsizing of the protector in this manner, the protector needs no longer to take the complicated shape, such as a three-dimensional shape that corresponds to a vehicle body, but the shape of a simple rectangular box, so that the protector can be used commonly with other types of vehicles.

DETAILED DESCRIPTION OF THE PREFERRED EMBODIMENTS

Hereinafter, an embodiment of the present invention will be described with reference to FIGS. 1 to 9.

Figure 1:
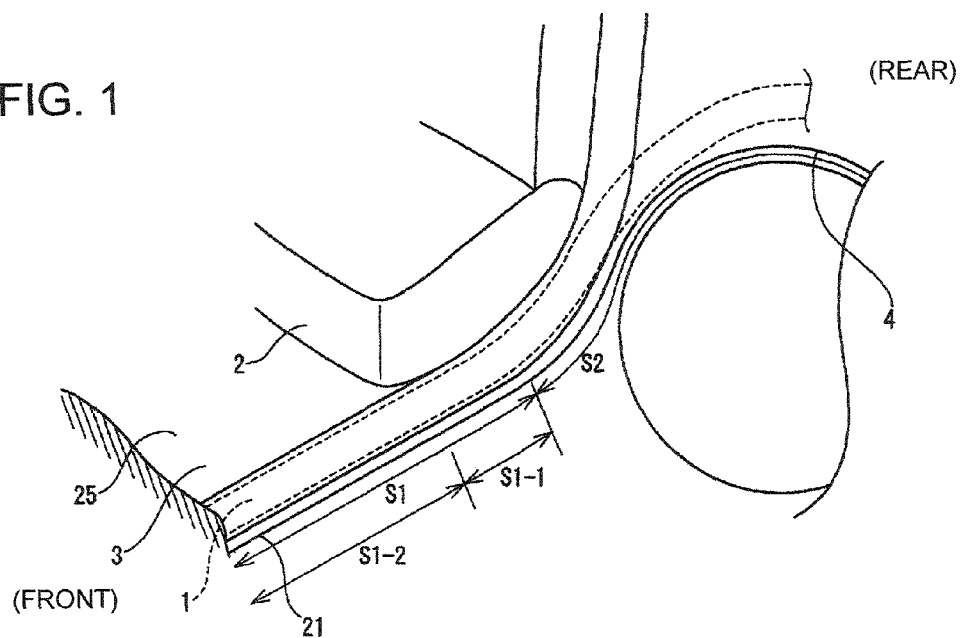
FIG. 1 is a perspective view illustrating a routing region where a wire harness of an embodiment of the present invention is routed.

As illustrated in FIG. 1, a floor harness 1 is routed from a front portion of a vehicle interior toward a rear trunk room of the vehicle along a sill side panel 21 that is located on a left edge. Conventionally, in a routing region from a region 51 underneath an opening 3 of a side door that faces a backseat 2 to a region S2 within a rear tire house 4, the floor harness 1 has been arranged inserted into a single elongated protector 100 (see FIG. 10).

Figure 2:
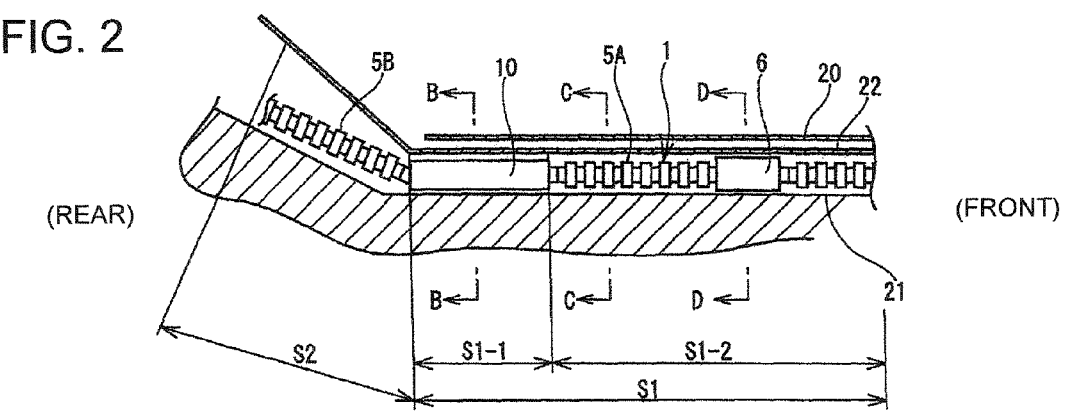
FIG. 2 is a cross-sectional view schematically illustrating the state in the routing region of FIG. 1 in which the wire harness is covered.

In contrast, according to the present embodiment, as illustrated in FIG. 2, a small-sized protector 10 is provided that is arranged only in a narrow region of a region S1-1 that is located on a rear side of the region 51 underneath the opening 3 of the side door and adjacent to the region S2 within the rear tire house 4, and the floor harness 1 is inserted into the protector 10. The protector 10 has the shape illustrated in FIGS. 3 and 4.

Figure 10:
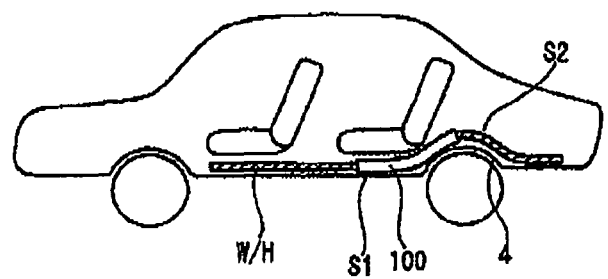
FIG. 10 is a schematic diagram illustrating a conventional example.
Figure 11A:
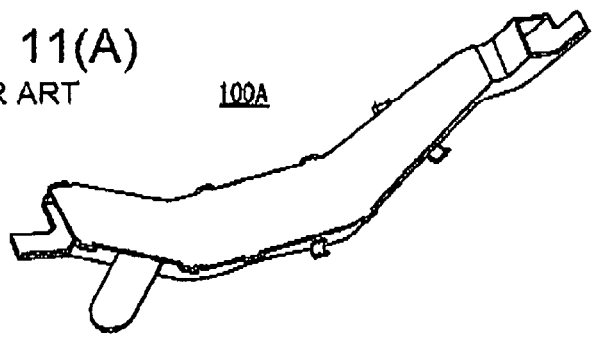
FIGS. 11(A) and 11(B) are perspective views illustrating conventional protectors.
Figure 11B:
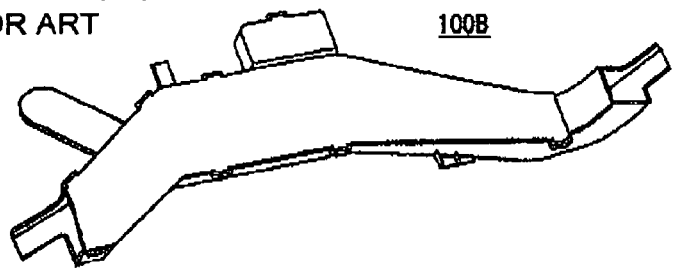

The protector 10 has a length L in a front-to-rear direction that is reduced by at least 50% relative to a length in the front-to-rear direction of the conventional protector 100 of FIGS. 10 and 11. According to the present embodiment, in the region of the floor harness 1 that has conventionally been covered with the protector 100, corrugated tubes 5A and 5B are arranged on both front and rear sides of the protector 10 so as to cover the floor harness 1, and a sill clip 6 is provided to the corrugated tube 5A that is located on the front side.

As described above, the reasons why only the region S1-1 is covered with the protector 10, and other regions S1-2 and S2 are covered with the corrugated tubes 5A and 5B are described as follows.

Figure 7:
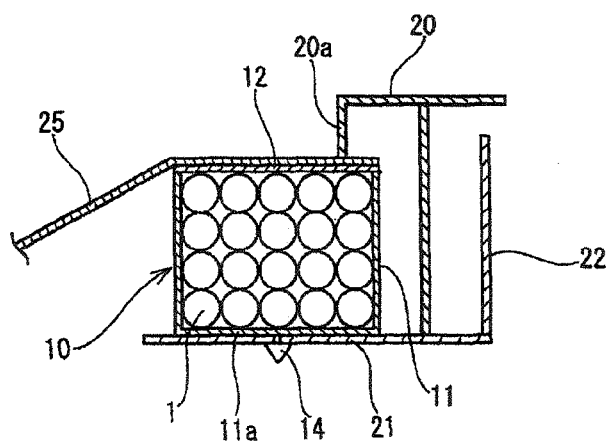
FIG. 7 is a cross-sectional view taken along the line B-B in FIG. 2.

As illustrated in FIGS. 2 and 7, since an end of the kicking plate 20 is located in the region S1-1 where the protector 10 is arranged, the floor harness 1 that is located below is liable to be subjected to impact loads that may be caused by stepping of a driver or passenger, dropped baggage, or the like.

Figure 8:
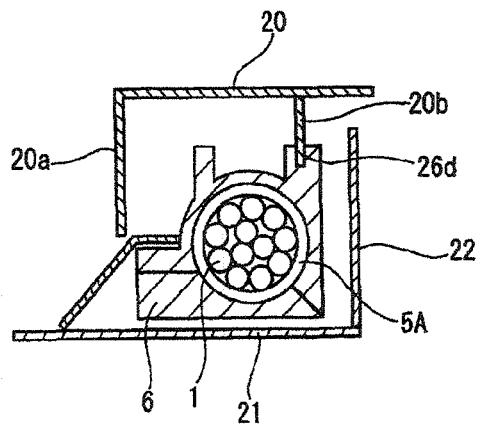
FIG. 8 is a cross-sectional view taken along the line D-D in FIG. 2.
Figure 9:
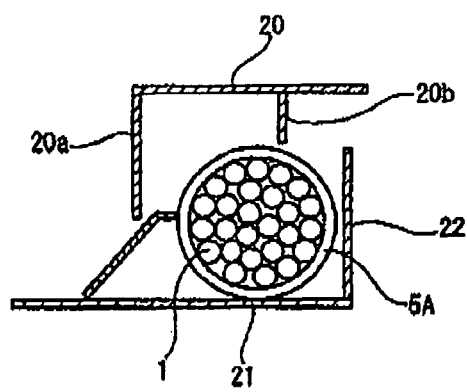
FIG. 9 is a cross-sectional view taken along the line C-C in FIG. 2.

On the other hand, in the region S1-2 other than the region S1-1 where the protector 10 is arranged, the floor harness 1 is not subjected to an external interference since it is enclosed by the kicking plate 20 on the upper side, by the sill side panel 21 on the lower side, and the sill side flange 22 on the outer side (see FIGS. 8 and 9). Also, since a routing path of the floor harness 1 on the sill side panel 21 on the lower side is a flat surface that extends in the front-to-rear direction, it is not necessary to limit the routing path, nor necessary to protect the floor harness 1 with the protector since loads from above are received by the kicking plate 20.

Figure 3A:
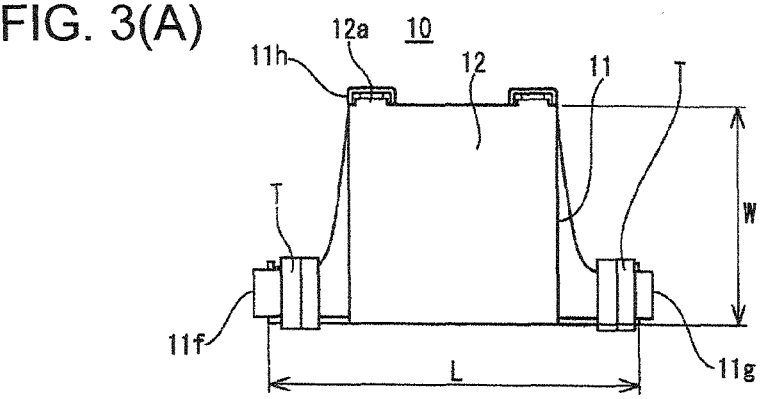
FIG. 3 illustrates a protector that is configured to cover the wire harness, specifically, in a plan view (FIG. 3(A)), in a cross-sectional view (FIG. 3(B)), and in a perspective view (FIG. 3(C)).
Figure 3B:
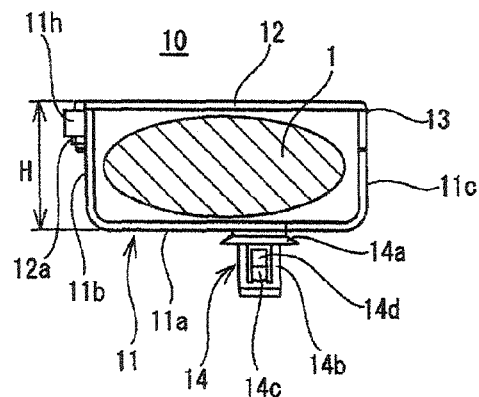
Figure 3C:
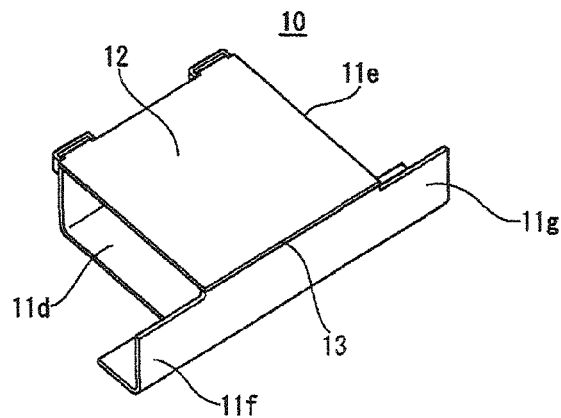
Figure 4A:
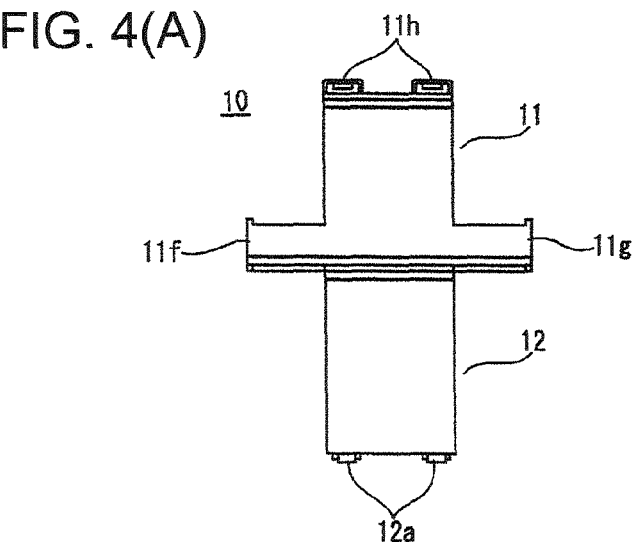
FIG. 4 illustrates the state in which a cover of the protector illustrated in FIG. 3 is opened, specifically, in a plan view (FIG. 4(A)) and in a front view (FIG. 4(B)).
Figure 4B:
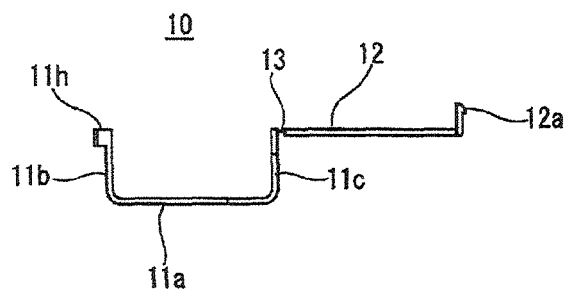
Figure 5:
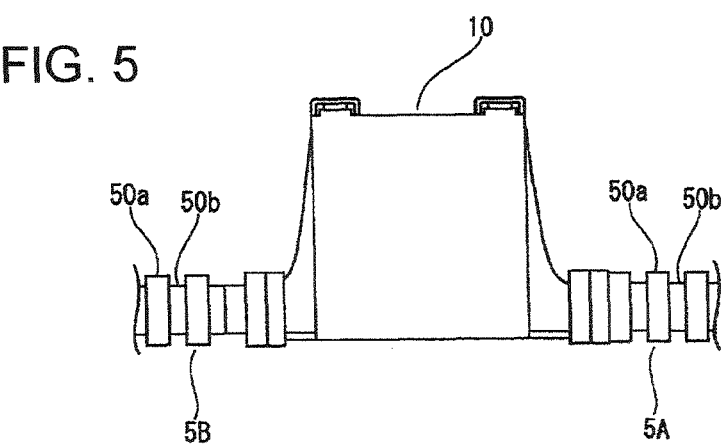
FIG. 5 is a plan view illustrating corrugated tubes that are mounted on both sides of the protector.

As illustrated in FIGS. 3 and 4, the protector 10 is configured with a box constituted by a main body 11 that has a rectangular shape with a shallow bottom and a cover 12. The main body 11 includes a bottom wall 11a, side walls 11b and 11c on its front and rear sides, openings 11d and 11e on its left and right sides through which the harness enters and exits, and tape-wrapped portions 11f and 11g that project from lower edges of the openings 11d and 11e.

A cover 12 is coupled to the upper end of the rear side wall 11c of the main body 11 via a thin-walled hinge 13 so as to be openable, and lock claws 12a are provided at a free end of the cover 12, lockingly coupling the cover 12 to lock frames 11h that are provided on the main body 11.

Furthermore, a clip 14, which is configured to be attached to the vehicle body, is provided in the center of the bottom wall 11a of the main body 11 in a projecting manner. The clip 14 is constituted by a dish-like portion 14a that projects from the bottom wall 11a, a shaft portion 14b that projects from the center of the dish-like portion 14a, a pair of blade portions 14c that are formed such that they are bent from the tip of the shaft portion 14b, and step-like latching portions 14d that are provided on the tips of the blade portions 14c.

Note that it is also possible to provide a clip mounting hole in the bottom wall of the main body, so that a blade-like clip may be inserted into the clip mounting hole and fixed thereto.

As described above, the protector 10 has a reduced height with a shallow bottom, and its height H is smaller than its width W and length L (H<W, L). In the present embodiment, the length L of the protector 10 including the tape-wrapped portions is 100 to 120 mm, its width W is 60 to 70 mm, and its height H is 25 to 35 mm.

A lower surface of the main body 11 of the protector 10 abuts on an upper surface of the sill side panel 21, and the protector 10 is set such that a lower end of a downward facing flange 20a of the kicking plate 20 is located on the upper surface of the cover 12, with the end of the floor carpet 25 in a width direction being disposed therebetween.

The corrugated tubes 5A and 5B, which cover the front and rear sides of the floor harness 1 extending out of the protector 10, have a general-purpose shape and are made from a resin molded article. That is, each corrugated tube includes annular mountain portions 50a and valley portions 50b that are alternately provided in its length direction, and can be easily extended/contracted and bent.

Figure 6:
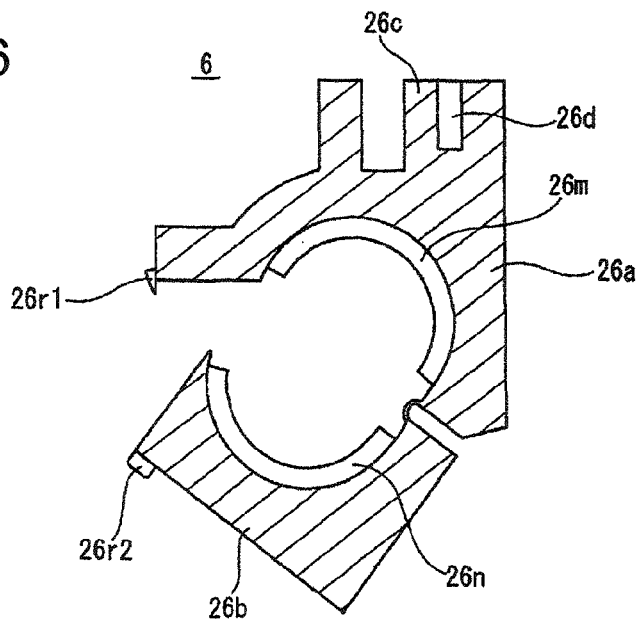
FIG. 6 is a cross-sectional view schematically illustrating a sill clip to be mounted on the corrugated tube.

A sill clip 6 is fitted on and fixed to the corrugated tube 5A, which covers a portion of the floor harness 1 that is located on the front side of the protector 10, that is, at a position of the corrugated tube 5A that is distanced by a predetermined length from the protector 10 and located below the kicking plate 20. As illustrated in FIG. 6, the sill clip 6 includes a pair of main bodies 26a and 26b that are fitted onto the corrugated tube 5. The pair of main bodies 26a and 26b constitute two parts of the sill clip 6, and their ends on one side are hinged to each other. After being fitted onto the corrugated tube 5, the sill clip 6 is configured to be fixed by lockingly coupling a lock portion 26r1 that is provided on a free end of the sill clip 6 and a counterpart portion 26r2. Further, ribs 26m and 26n that are fitted to a valley portion 50b of the corrugated tube 5 are provided on inner circumferences of the main bodies 26a and 26b. A supporting projection 26c is provided that projects from an upper surface of one main body 26a, and includes a holding groove 26d into which a lower portion of the fixing portion 20b that projects downward from the kicking plate 20 is inserted.

As described above, in the routing regions S1 (S1-1 and S1-2) and S2 of the floor harness 1, the floor harness 1 is covered with the corrugated tube 5A, the protector 10, and the corrugated tube 5B, the sill clip 6 being fitted onto the corrugated tube 5A.

At the location where the floor harness 1 is inserted into the protector 10, a group of wires constituting the floor harness 1 is flattened and inserted into the main body 11, both sides of the group of wires, together with the tape-wrapped portions 11f and 11g, are wrapped with tapes T, and the cover 12 is closed and lockingly connected to the main body 11.

Further, after the pair of main bodies 26a and 26b of the sill clip 6 is fitted onto a predetermined position of the corrugated tube 5A, the lock portions that are provided on an opening and closing end of the main bodies 26a and 26b are connected, and the supporting projection 26c is adjusted so as to face upward.

As described above, the floor harness 1 that is covered with the protector 10, the corrugated tubes 5A and 5B, and the sill clip 6 in the regions S1 and S2 is routed in the automobile.

As illustrated in FIG. 7, the protector 10 is located at the rear end of the kicking plate 20, the bottom wall 11a of the main body is arranged on the sill side panel 21, and the clip 14 is inserted and latched into the clip mounting hole that is provided in the sill side panel 21. In this state, the edge of the floor carpet 25 in its width direction is arranged on the upper surface of the cover 12 of the protector 10, and the flange 20a that bends downward from the inner end of the kicking plate 20 in its width direction abuts on the upper surface of the cover 12 of the protector 10, with the floor carpet 25 being disposed therebetween. With this measure, the kicking plate 20 can be supported by the protector 10, and the protector 10 can also be fixed between the sill side panel 21 and the kicking plate 20.

Furthermore, as illustrated in FIG. 8, the corrugated tube 5A that covers the floor harness 1 is arranged on the upper surface of the sill side panel 21, and the fixing portion 20b, which projects downward from the kicking plate 20, is inserted into the holding groove 26d of the upward projecting supporting projection 26c of the sill clip 6. With this measure, as illustrated in FIG. 9, the kicking plate 20 located above the upper surface of the corrugated tube 5A can be positioned and held with the sill clip 6.

Since the above-described protector 10 is just to cover the region of the floor harness 1 that corresponds to the rear end of the kicking plate 20, it is possible to downsize the protector 10 relative to a conventionally used protector illustrated in FIGS. 10 and 11, and to configure the protector 10 with a simple box shape with a shallow bottom. Therefore, the protector 10 can be used commonly with vehicles whose main bodies have different shapes depending on, for example, the type of vehicle or whether it is a left-hand drive vehicle or a right-hand drive vehicle. Also, in the portion anterior to the end of the kicking plate 20, since the floor harness 1 is protected by the kicking plate 20 against loads from above and the routing path of the floor harness 1 merely extends on a horizontal surface in the front-to-rear direction, it is not necessary to limit and protect the routing path with the protector, the corrugated tube 5A sufficing for protecting the routing path. Similarly, by covering a region of the floor harness 1 that is routed in the region S2 within the tire house with the corrugated tube 5B, it is possible to easily subject the floor harness 1 to the three-dimensional routing.

As described above, conventionally many types of protectors have been required depending on the vehicle shape. In contrast, according to the present invention, a region that needs to be covered with the protector is distinguished from a region that does not need to be covered with the protector, so that only the region that needs to be covered with the protector is covered with the protector, achieving downsizing of the protector. By the downsizing of the protector, it is possible to configure the protector with a simple box shape, as the result, the protector can be commonly used irrespective of types of vehicles or whether it is a left-hand drive vehicle or a right-hand drive vehicle.

The present invention is not limited to the above-explained embodiment. Although the present invention has been explained taking the example in which portions of the floor harness on the front and rear sides of the protector 10 are covered with the corrugated tubes, it is also possible to wrap the portions of the floor harness with, instead of the corrugated tubes, circular tubes or thick-walled tapes.

The invention claimed is:

1. An outer cover structure for a wire harness, the wire harness being a floor harness that is routed from a front portion of a vehicle interior toward a vehicle rear portion along an upper surface side of a sill panel and below a kicking plate, the outer cover structure comprising:
   a protector provided at a position corresponding to a rear end of the kicking plate, the protector having a body formed with a bottom wall, opposed first and second lateral walls projecting up from the bottom wall a distance less than a spacing between the lateral walls, a cover hinged from an upper end of the first lateral wall and being releasably engageable with an upper end of the second lateral wall, front and rear openings formed at front and rear ends of the body and front and rear tape wrapped portions extending forward and rearward from the openings, the bottom wall having a lower surface, and only one clip for fixation projecting from the lower surface of the bottom wall of the protector for fixing the protector to the sill panel;

a front protective tube extending forward from the opening in the front end of the body of the protector and being taped to front tape wrapped portion; and a rear protective tube extending rearward from the rear opening in the rear end of the body of the protector and being taped to the rear tape wrapped portion wall.

2. The outer cover structure for a wire harness according to claim 1, wherein the protector, including the tape-wrapped portions on the front and rear walls, has a front-to-rear length that is not greater than 120 mm and a height that is 25 mm to 35 mm, and the clip is a blade-like clip that is provided projecting from a center of the bottom wall of the body.

3. The outer cover structure for a wire harness according to claim 2, wherein, when the floor harness has been routed in the vehicle, the protector is arranged at a location where the protector receives a flange of the kicking plate that is provided projecting downward from the rear end of the kicking plate.

4. The outer cover structure for a wire harness according to claim 3, wherein a sill clip is fitted onto the front protective tube at a location below the front side of the kicking plate, and the sill clip includes a supporting projection having a holding groove into which a bracket that projects from a lower surface of the kicking plate is inserted and that holds the bracket.

5. The outer cover structure for a wire harness according to claim 1, wherein, when the floor harness has been routed in the vehicle, the protector is arranged at a location where the protector receives a flange of the kicking plate that is provided projecting downward from the rear end of the kicking plate.

6. The outer cover structure for a wire harness according to claim 5, wherein a sill clip is fitted onto the front protective tube at a location below the front side of the kicking plate, and the sill clip includes a supporting projection having a holding groove into which a bracket that projects from a lower surface of the kicking plate is inserted and that holds the bracket.

7. The outer cover structure for a wire harness according to claim 1, wherein a sill clip is fitted onto the front protective tube at a location below the front side of the kicking plate, and the sill clip includes a supporting projection having a holding groove into which a bracket that projects from a lower surface of the kicking plate is inserted and that holds the bracket.

8. The outer cover structure for a wire harness according to claim 1, wherein the front and rear tape wrapped portions extend from the first lateral wall and from a part of the bottom wall adjacent the first lateral wall to define substantially L-shapes.

9. The outer cover structure for a wire harness according to claim 1, wherein portions of the floor harness between the front-end rear openings of the protector are not in either of the protective tubes and are spread laterally toward the lateral walls of the protector.

10. The outer cover structure for a wire harness according to claim 1, wherein the protective tubes are corrugated tubes.

11. A protector for protecting a wire harness between a sill plate and a kicking plate on either side of a motor vehicle, the protector comprising: a rectangular body having a bottom wall, opposed first and second lateral walls projecting up from the bottom wall a distance less than a spacing between the lateral walls, a cover hinged from an upper end of the first lateral wall and being releasably engageable with an upper end of the second lateral wall, front and rear openings formed at front and rear ends of the body and front and rear substantially identical tape wrapped portions extending forward and rearward from the openings, each of the tape wrapped portions having a side panel extending from the first lateral wall and a bottom panel extending from a part of the bottom wall adjacent the first lateral wall so that each of the tape wrapped portions defines a substantially L-shape, the bottom wall having a lower surface, and only one clip for fixation projecting from the lower surface of the bottom wall of the protector at a position substantially centrally between the front and rear ends of the body for fixing the protector to the sill panel, whereby the protector can be reversed and positioned on either lateral side of the vehicle.

12. The protector of claim 11, wherein a length of the protector, including the tape-wrapped portions, is not greater than 120 mm and wherein the protector has a height that is 25 mm to 35 mm and a width that is 60 mm to 70 mm.

* * * * *